United States Patent
Derat et al.

(10) Patent No.: US 10,908,980 B2
(45) Date of Patent: Feb. 2, 2021

(54) METHOD AND SYSTEM FOR DETECTING FAULTY DEVICES

(71) Applicant: Rohde & Schwarz GmbH & Co. KG, Munich (DE)

(72) Inventors: Benoit Derat, Munich (DE); Athanasios Karamalis, Munich (DE); Sherif Ahmed, Starnberg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 142 days.

(21) Appl. No.: 16/196,851

(22) Filed: Nov. 20, 2018

(65) Prior Publication Data
US 2020/0159606 A1 May 21, 2020

(51) Int. Cl.
*G06F 11/07* (2006.01)
*G06F 11/30* (2006.01)
*H04B 5/00* (2006.01)

(52) U.S. Cl.
CPC ...... *G06F 11/0751* (2013.01); *G06F 11/3055* (2013.01); *H04B 5/0031* (2013.01)

(58) Field of Classification Search
CPC .... G01R 35/00; G01R 35/005; G01R 31/282; G06F 11/273; G06F 11/277; G06F 11/263; G06F 11/0751; G06F 11/3055; G06K 7/10336; G06K 7/10346
See application file for complete search history.

(56) References Cited

U.S. PATENT DOCUMENTS

| | | | |
|---|---|---|---|
| 7,154,283 B1* | 12/2006 | Weakley | G01R 29/08 324/756.01 |
| 9,244,145 B2* | 1/2016 | Min | G01R 35/005 |
| 2008/0018327 A1* | 1/2008 | Reynolds | H04W 16/18 324/200 |
| 2013/0027244 A1* | 1/2013 | Babakhani | G01S 13/89 342/179 |
| 2017/0248674 A1* | 8/2017 | Patton | G01R 35/005 |
| 2019/0356397 A1* | 11/2019 | DaSilva | G01R 29/10 |

FOREIGN PATENT DOCUMENTS

CN 107886500 A 4/2018

OTHER PUBLICATIONS

EDN Network, MITTAL, "Machine learning improves production test", dated Jul. 26, 2017, 7 pages.
Kale et al., "Wind Turbine Fault Detection Using Machine Learning and Neural Networks", dated Nov. 5, 2018, 9 pages.

* cited by examiner

*Primary Examiner* — Kamini B Patel
*Assistant Examiner* — Kurosu Risa Altaf
(74) *Attorney, Agent, or Firm* — Ditthavong & Steiner, P.C.

(57) ABSTRACT

A method and a system for detecting faulty devices are provided. The method comprises the steps of gathering test data in near field with respect to a device under test, extrapolating the test data to far field conditions with the aid of at least one machine learning technique, and evaluating a far field performance of the device under test on the basis of the far field conditions.

20 Claims, 2 Drawing Sheets

METHOD AND SYSTEM FOR DETECTING FAULTY DEVICES

TECHNICAL FIELD

The invention relates to a method and a system for detecting faulty devices, especially devices providing wireless communication capabilities, wherein the method and the system are based on machine learning techniques.

BACKGROUND ART

Generally, in times of an increasing number of applications employing a plurality of electrical circuits, especially circuitry providing wireless communication capabilities, there is a growing need of a method and a system especially for verifying correct functioning of said applications or detecting faulty devices, respectively, in a highly efficient and accurate manner.

CN 107886500 A discloses a product production monitoring method and system based on machine vision and machine learning, the method comprising performing feature extraction on an image of a product to be inspected to obtain an image feature of the product to be detected. The feature determines a defect type of the product to be detected by using a preset machine learning model, and then sends a control instruction to the controlled device according to the defect type to instruct the controlled device to execute the control instruction. As it can be seen, due to the purely optical investigation of the product to be tested, both said product production monitoring method and system can disadvantageously not ensure an efficient and accurate measurement or defect detection with special respect to devices providing wireless communication capabilities.

Accordingly, there is a need to provide a method and a system for detecting faulty devices, especially devices providing wireless communication capabilities, in a highly efficient and accurate manner.

SUMMARY OF THE INVENTION

According to a first aspect of the invention, a method for detecting faulty devices is provided. The method comprises the steps of gathering test data in near field with respect to a device under test, extrapolating the test data to far field conditions with the aid of at least one machine learning technique, and evaluating a far field performance of the device under test on the basis of the far field conditions. Advantageously, in this manner, faulty devices can be detected in a highly efficient and accurate manner. In this context, it is noted that a faulty device might be offset in magnitude and/or phase. Additionally or alternatively, a faulty device might have a design error such as a defect in its housing.

According to a first implementation form of the first aspect of the invention, the test data is sparse test data. In this context, it is noted that the sparse test data is especially gathered, since the device under test may preferably be measured along a production line at a manufacturing site with a very limited amount of measuring time available. Advantageously, for instance, efficiency can further be increased especially due to a reduction of the necessary measurement time.

According to a second implementation form of the first aspect of the invention, the sparse test data comprises less information than reconstruction data being necessary for reconstructing a far field behavior of the device under test with the aid of a non-machine learning technique. In addition to this or as an alternative, the sparse test data is recorded in a short amount of time, preferably during production of the device under test, and/or with limited resources. Advantageously, less information is sufficient for a defect detection, thereby increasing efficiency.

According to a further implementation form of the first aspect of the invention, the non-machine learning technique comprises at least one of a spherical wave expansion, a plane wave expansion, or a multiple expansion.

According to a further implementation form of the first aspect of the invention, gathering the test data is done in an over-the-air manner. Advantageously, this especially allows for detecting faulty devices providing wireless communication capabilities.

According to a further implementation form of the first aspect of the invention, gathering the test data employs less than 100 measurement antennas, preferably less than 50 measurement antennas, more preferably less than 20 measurement antennas, most preferably less than 10 measurement antennas. Advantageously, complexity can further be reduced, which leads to an increased efficiency.

According to a further implementation form of the first aspect of the invention, a number of measurement antennas being employed for gathering the test data is reduced by a factor of 10 in comparison to a far field measurement with respect to the device under test and/or in comparison to a reconstructed far field measurement having been extrapolated on the basis of a near field measurement with the aid of a non-machine learning technique. Advantageously, efficiency can further be increased especially by reducing complexity.

According to a further implementation form of the first aspect of the invention, the method further comprises the step of recalibrating the device under test on the basis of the far field conditions especially in the case that the device under test comprises a calibration error, preferably a calibration error in magnitude, more preferably a calibration error in phase, most preferably a calibration error in magnitude and phase. Advantageously, some faulty devices can easily and efficiently be repaired.

According to a further implementation form of the first aspect of the invention, the method further comprises the step of training the at least one machine learning technique on the basis of at least one of simulated data, approximated data, predefined data, or real data. Advantageously, efficiency and accuracy can continuously be increased or improved especially by training. In this context, it is further noted that simulated data may preferably comprise data generated by a simulator or a processor. Additionally, approximated data may preferably comprise data having been approximated on the basis of a simulation or a practical measurement scenario. Further additionally, predefined data may preferably comprise data having been predefined by a user. Moreover, real data may preferably comprise data having been gathered on the basis of a practical measurement scenario.

According to a further implementation form of the first aspect of the invention, the method further comprises the step of training the at least one machine learning technique on the basis of real data measured at a production line of devices under test. Advantageously, for instance, efficiency and accuracy can further be increased with special respect to a practical defect detection.

According to a further implementation form of the first aspect of the invention, the step of training the at least one machine learning technique on the basis of real data measured at a production line of devices under test comprises extrapolating near field data at production site to far field data. Advantageously, for example, extrapolation can further be improved, thereby increasing efficiency.

According to a further implementation form of the first aspect of the invention, the step of training the at least one machine learning technique on the basis of real data measured at a production line of devices under test comprises getting near field data measured at production site in combination with quality data with respect to the device under test, and training the at least one machine learning technique on the basis of at least one of the near field data or the quality data. Advantageously, for instance, accuracy, and thus also efficiency, can further be increased.

According to a further implementation form of the first aspect of the invention, the step of training the at least one machine learning technique on the basis of real data measured at a production line of devices under test comprises extrapolating near field data at production site to far field data, getting the near field data measured at the production site in combination with quality data with respect to the device under test, and training the at least one machine learning technique on the basis of at least one of the near field data, the far field data, or the quality data. Advantageously, for instance, accuracy can further be increased, which leads to an increased efficiency.

According to a second aspect of the invention, a system for detecting faulty devices is provided. The system comprises a measurement equipment configured to gather test data in near field with respect to a device under test, an extrapolator configured to extrapolate the test data to far field conditions with the aid of at least one machine learning technique, and an evaluator configured to evaluate a far field performance of the device under test on the basis of the far field conditions. Advantageously, in this manner, faulty devices can be detected in a highly efficient and accurate manner. In this context, it is noted that a faulty device might be offset in magnitude and/or phase. Additionally or alternatively, a faulty device might have a design error such as a defect in its housing.

According to a first implementation form of the second aspect of the invention, the test data is sparse test data. In addition to this or as an alternative, the test data or the sparse test data comprises less information than reconstruction data being necessary for reconstructing a far field behavior of the device under test with the aid of a non-machine learning technique. Further additionally or further alternatively, the test data or the sparse test data is recorded in a short amount of time, preferably during production of the device under test, and/or with limited resources. In further addition to this or as a further alternative, the non-machine learning technique comprises at least one of a spherical wave expansion, a plane wave expansion, or a multiple expansion. Advantageously, for instance, efficiency can further be increased especially due to a reduction of the necessary measurement time. Further advantageously, less information is sufficient for a defect detection, thereby increasing efficiency.

According to a second implementation form of the second aspect of the invention, the measurement equipment gathers the test data in an over-the-air manner. Additionally or alternatively, the measurement equipment comprises less than 100 measurement antennas, preferably less than 50 measurement antennas, more preferably less than 20 measurement antennas, most preferably less than 10 measurement antennas. In further addition to this or as a further alternative, the measurement equipment comprises a number of measurement antennas being reduced by a factor of 10 in comparison to a far field measurement with respect to the device under test and/or in comparison to a reconstructed far field measurement having been extrapolated on the basis of a near field measurement with the aid of a non-machine learning technique. Advantageously, this especially allows for detecting faulty devices providing wireless communication capabilities. Further advantageously, complexity can further be reduced, which leads to an increased efficiency.

According to a further implementation form of the second aspect of the invention, the evaluator is further configured to recalibrate the device under test on the basis of the far field conditions especially in the case that the device under test comprises a calibration error, preferably a calibration error in magnitude, more preferably a calibration error in phase, most preferably a calibration error in magnitude and phase. Advantageously, some faulty devices can easily and efficiently be repaired.

According to a further implementation form of the second aspect of the invention, the system further comprises a training processor configured to train the at least one machine learning technique on the basis of at least one of simulated data, approximated data, predefined data, or real data. Advantageously, efficiency and accuracy can continuously be increased or improved especially by training. In this context, it is further noted that simulated data may preferably comprise data generated by a simulator or a processor. Additionally, approximated data may preferably comprise data having been approximated on the basis of a simulation or a practical measurement scenario. Further additionally, predefined data may preferably comprise data having been predefined by a user. Moreover, real data may preferably comprise data having been gathered on the basis of a practical measurement scenario.

According to a further implementation form of the second aspect of the invention, the system further comprises a training processor configured to train the at least one machine learning technique on the basis of real data measured at a production line of devices under test.

Advantageously, for instance, efficiency and accuracy can further be increased with special respect to a practical defect detection.

According to a further implementation form of the second aspect of the invention, the training processor is further configured to receive near field data measured at production site in combination with quality data with respect to the device under test from the measurement equipment. In addition to this, the training processor is further configured to train the at least one machine learning technique on the basis of at least one of the near field data or the quality data. Advantageously, for instance, accuracy, and thus also efficiency, can further be increased.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
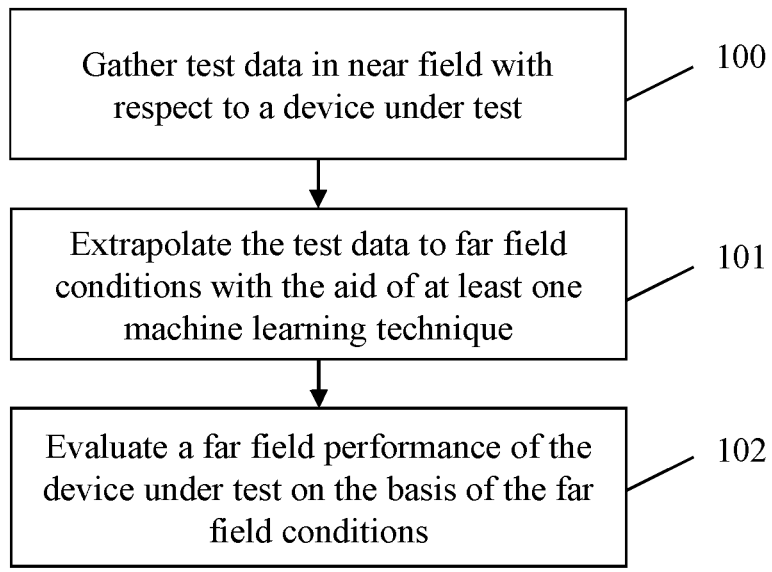
FIG. 1 shows a flow chart of an exemplary embodiment of the first aspect of the invention.

Firstly, FIG. 1 shows a flow chart of an exemplary embodiment of the inventive method for detecting faulty devices. In a first step 100, test data in near field is gathered with respect to a device under test. Then, in a second step 101, the test data is extrapolated to far field conditions with the aid of at least one machine learning technique. Furthermore, in a third step 102, a far field performance of the device under test is evaluated on the basis of the far field conditions.

In this context, the test data may preferably be sparse test data. Said sparse test data may preferably comprise less information than reconstruction data being necessary for reconstructing a far field behavior of the device under test with the aid of a non-machine learning technique.

In addition to this or as an alternative, the sparse test data may especially be recorded in a short amount of time, preferably during production of the device under test, and/or with limited resources.

It is further noted that the above-mentioned non-machine learning technique may preferably comprise at least one of a spherical wave expansion, a plane wave expansion, or a multiple expansion.

It might be particularly advantageous if gathering the test data is done in an over-the-air manner.

Furthermore, gathering the test data may especially employ less than 100 measurement antennas, preferably less than 50 measurement antennas, more preferably less than 20 measurement antennas, most preferably less than 10 measurement antennas.

Moreover, it is noted that a number of measurement antennas being employed for gathering the test data may especially be reduced by a factor of 10, preferably by a factor of 50, in comparison to a far field measurement with respect to the device under test and/or in comparison to a reconstructed far field measurement having been extrapolated on the basis of a near field measurement with the aid of a non-machine learning technique.

It should be mentioned that it might be particularly advantageous if the method further comprises the step of recalibrating the device under test on the basis of the far field conditions especially in the case that the device under test comprises a calibration error, preferably a calibration error in magnitude, more preferably a calibration error in phase, most preferably a calibration error in magnitude and phase.

Additionally, the method may further comprise the step of training the at least one machine learning technique on the basis of at least one of simulated data, approximated data, predefined data, or real data.

Further additionally, the method may further comprise the step of training the at least one machine learning technique on the basis of real data measured at a production line of devices under test.

In this context, the step of training the at least one machine learning technique on the basis of real data measured at a production line of devices under test may preferably comprise extrapolating near field data at production site to far field data.

In addition to this, the step of training the at least one machine learning technique on the basis of real data measured at a production line of devices under test may preferably comprise getting near field data measured at production site in combination with quality data with respect to the device under test, and training the at least one machine learning technique on the basis of at least one of the near field data or the quality data.

Further additionally, the two foregoing paragraphs may preferably be combined. In other words, the step of training the at least one machine learning technique on the basis of real data measured at a production line of devices under test may preferably comprise extrapolating near field data at production site to far field data, getting the near field data measured at the production site in combination with quality data with respect to the device under test, and training the at least one machine learning technique on the basis of at least one of the near field data, the far field data, or the quality data.

Figure 2:
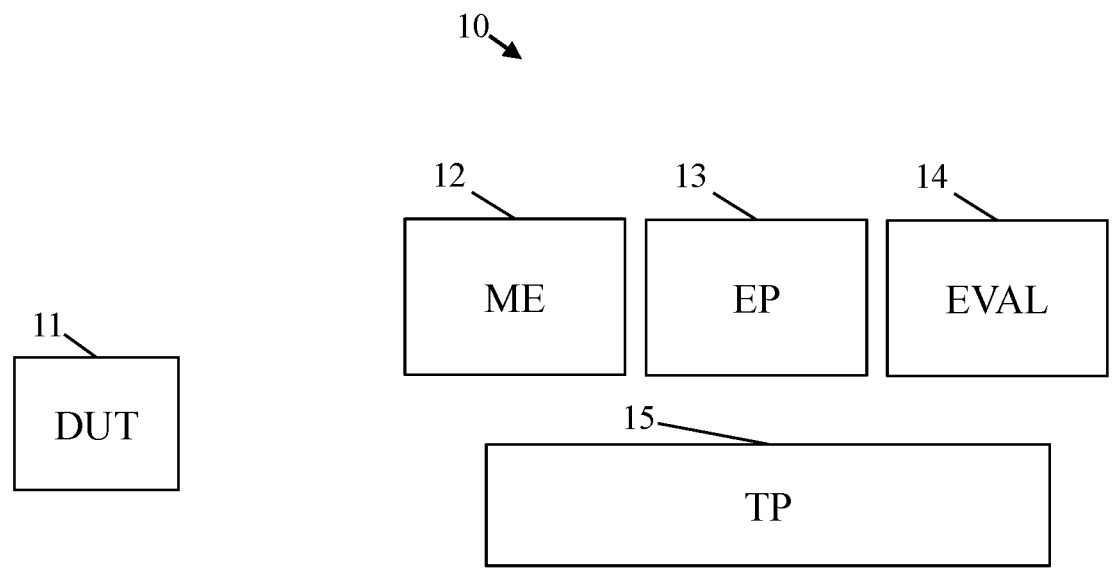
FIG. 2 shows an exemplary embodiment of the second aspect of the invention.

Now, with respect to FIG. 2, an exemplary embodiment of the inventive system 10 for detecting faulty devices is depicted. Said system 10 comprises a measurement equipment 12, an extrapolator 13, an evaluator 14, and a training processor 15.

It should be mentioned that it might be particularly advantageous if at least two of the measurement equipment 12, the extrapolator 13, the evaluator 14, and the training processor 15 may especially be implemented into a device or an apparatus for detecting faulty devices. In addition to this or as an alternative, at least two of the measurement equipment 12, the extrapolator 13, the evaluator 14, and the training processor 15 may especially be embodied as a processor, preferably a single processor.

Furthermore, the measurement equipment 12 gathers test data in near field with respect to a device under test 11. The extrapolator 13 extrapolates the test data to far field conditions with the aid of at least one machine learning technique, and the evaluator 14 evaluates a far field performance of the device under test 11 on the basis of the far field conditions.

In addition to this, the test data may preferably be sparse test data. Additionally or alternatively, the test data or the sparse test data may preferably comprise less information than reconstruction data being necessary for reconstructing a far field behavior of the device under test 11 with the aid of a non-machine learning technique.

In further addition to this or as a further alternative, the test data or the sparse test data may especially be recorded in a short amount of time, preferably during production of the device under test 11, and/or with limited resources.

With respect to the above-mentioned non-machine learning technique, it is noted that the non-machine learning technique may preferably comprise at least one of a spherical wave expansion, a plane wave expansion, or a multiple expansion.

It might be particularly advantageous if the measurement equipment 12 gathers the test data in an over-the-air manner.

In this context, the measurement equipment 12 may especially comprise less than 100 measurement antennas, preferably less than 50 measurement antennas, more preferably less than 20 measurement antennas, most preferably less than 10 measurement antennas.

In addition to this or as an alternative, the measurement equipment 12 may especially comprise a number of measurement antennas being reduced by a factor of 10, preferably by a factor of 50, in comparison to a far field measurement with respect to the device under test and/or in comparison to a reconstructed far field measurement having been extrapolated on the basis of a near field measurement with the aid of a non-machine learning technique such as the above-mentioned non-machine learning technique.

With respect to the evaluator 14, it might be particularly advantageous if the evaluator 14 is further configured to recalibrate the device under test 11 on the basis of the far field conditions especially in the case that the device under test 11 comprises a calibration error, preferably a calibration error in magnitude, more preferably a calibration error in phase, most preferably a calibration error in magnitude and phase.

With respect to the training processor 15 of the system 10, it is noted that the training processor 15 trains the at least one machine learning technique on the basis of at least one of simulated data, approximated data, predefined data, or real data.

In this context, it might be particularly advantageous if the training processor 15 trains the at least one machine learning technique preferably on the basis of real data measured at a production line of devices under test.

In addition to this, the training processor 15 may preferably receive near field data measured at production site in combination with quality data with respect to the device under test 11 from the measurement equipment 12.

Further additionally, the training processor 15 may further train the at least one machine learning technique on the basis of at least one of the near field data or the quality data.

Moreover, especially in the case that the training processor 15 does not only receive the near field data and the quality data but does also receive far field data, preferably far field data having been extrapolated from near field data, more preferably far field data having been extrapolated from near field data at production site, most preferably far field data having been extrapolated from the near field data, from the extrapolator 13, the training processor 15 may preferably train the at least one machine learning technique on the basis of at least one of the near field data, the far field data, or the quality data.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for detecting faulty devices, the method comprising the steps of:
    gathering test data in near field with respect to a device under test,
    extrapolating the test data to far field conditions with the aid of at least one machine learning technique, and
    evaluating a far field performance of the device under test on the basis of the far field conditions,
    wherein a number of measurement antennas being employed for gathering the test data is reduced by a factor of at least 10 in comparison to a reconstructed far field measurement having been extrapolated on the basis of a near field measurement with the aid of a nonmachine learning technique.

2. The method according to claim 1, wherein the test data is sparse test data.

3. The method according to claim 2,
    wherein the sparse test data comprises less information than reconstruction data being necessary for reconstructing a far field behavior of the device under test with the aid of a non-machine learning technique, or
    wherein the sparse test data is recorded during production of the device under test, or with limited resources.

4. The method according to claim 3,
    wherein the non-machine learning technique comprises at least one of a spherical wave expansion, a plane wave expansion, or a multiple expansion.

5. The method according to claim 1, wherein gathering the test data is done in an over-the-air manner.

6. The method according to claim 1,
    wherein gathering the test data employs less than 100 measurement antennas, less than 50 measurement antennas, less than 20 measurement antennas, or less than 10 measurement antennas.

7. The method according to claim 1,
    wherein the number of measurement antennas being employed for gathering the test data is reduced by a factor of 10 in comparison to a far field measurement with respect to the device under test.

8. The method according to claim 1,
    wherein the method further comprises the step of recalibrating the device under test on the basis of the far field conditions selected from a calibration error in magnitude, a calibration error in phase, or a calibration error in magnitude and phase.

9. The method according to claim 1,
    wherein the method further comprises the step of training the at least one machine learning technique on the basis of at least one of simulated data, approximated data, predefined data, or real data.

10. The method according to claim 1,
    wherein the method further comprises the step of training the at least one machine learning technique on the basis of real data measured at a production line of devices under test.

11. The method according to claim 10,
    wherein the step of training the at least one machine learning technique on the basis of real data measured at a production line of devices under test comprises extrapolating near field data at production site to far field data.

12. The method according to claim 10,
    wherein the step of training the at least one machine learning technique on the basis of real data measured at a production line of devices under test comprises:
    getting near field data measured at production site in combination with quality data with respect to the device under test, and
    training the at least one machine learning technique on the basis of at least one of the near field data or the quality data.

13. The method according to claim 10,
    wherein the step of training the at least one machine learning technique on the basis of real data measured at a production line of devices under test comprises:
    extrapolating near field data at production site to far field data,
    getting the near field data measured at the production site in combination with quality data with respect to the device under test, and
    training the at least one machine learning technique on the basis of at least one of the near field data, the far field data, or the quality data.

14. A system for detecting faulty devices, the system comprising:

a measurement equipment configured to gather test data in near field with respect to a device under test, an extrapolator configured to extrapolate the test data to far field conditions with the aid of at least one machine learning technique, and an evaluator configured to evaluate a far field performance of the device under test on the basis of the far field conditions, wherein the measurement equipment comprises a number of measurement antennas being reduced by a factor of at least 10 in comparison to a reconstructed far field measurement having been extrapolated on the basis of a near field measurement with the aid of a nonmachine learning technique.

15. The system according to claim 14, wherein the test data is sparse test data, or wherein the test data or the sparse test data comprises less information than reconstruction data being necessary for reconstructing a far field behavior of the device under test with the aid of a non-machine learning technique, or wherein the test data or the sparse test data is recorded in a short amount of time, preferably during production of the device under test, and/or with limited resources, or wherein the non-machine learning technique comprises at least one of a spherical wave expansion, a plane wave expansion, or a multiple expansion.

16. The system according to claim 14, wherein the measurement equipment gathers the test data in an over-the-air manner, or wherein the measurement equipment comprises less than 100 measurement antennas, preferably less than 50 measurement antennas, more preferably less than 20 measurement antennas, most preferably less than 10 measurement antennas, or wherein the measurement equipment comprises the number of measurement antennas being reduced by a factor of 10 in comparison to a far field measurement with respect to the device under test.

17. The system according to claim 14, wherein the evaluator is further configured to recalibrate the device under test on the basis of the far field conditions selected from a calibration error in magnitude, a calibration error in phase, or a calibration error in magnitude and phase.

18. The system according to claim 14, wherein the system further comprises a training processor configured to train the at least one machine learning technique on the basis of at least one of simulated data, approximated data, predefined data, or real data.

19. The system according to claim 14, wherein the system further comprises a training processor configured to train the at least one machine learning technique on the basis of real data measured at a production line of devices under test.

20. The system according to claim 19, wherein the training processor is further configured to receive near field data measured at production site in combination with quality data with respect to the device under test from the measurement equipment, and wherein the training processor is further configured to train the at least one machine learning technique on the basis of at least one of the near field data or the quality data.

* * * * *